Dec. 10, 1929.  G. W. VEALE  1,739,272
BUMPER
Filed March 16, 1927
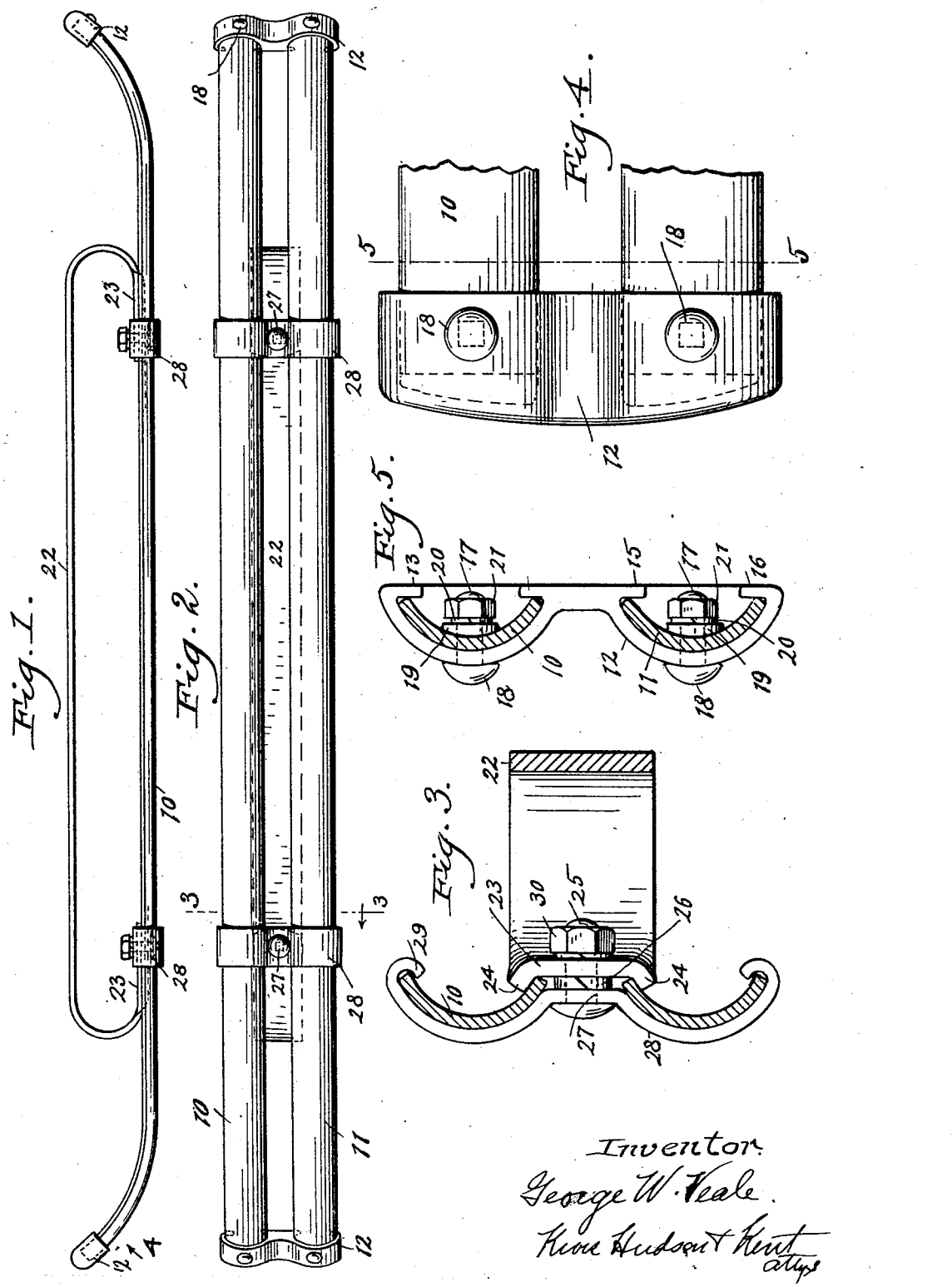

Patented Dec. 10, 1929

1,739,272

UNITED STATES PATENT OFFICE

GEORGE W. VEALE, OF CLEVELAND HEIGHTS, OHIO, ASSIGNOR TO THE EATON AXLE-SPRING COMPANY, OF CLEVELAND, OHIO, A CORPORATION OF OHIO

BUMPER

Application filed March 16, 1927. Serial No. 175,669.

This invention relates to improvements in bumpers for automotive vehicles and has particular reference to the form of the impact bars and their mounting.

Tubular impact bars have acquired some little vogue in the industry on account of their ability to withstand heavy blows. Their appearance of solidity and strength is also in their favor.

One of the objects of the present invention is to provide a bumper bar which shall have some of the rigidity and shock withstanding characteristics of the tubular bar and some of the substantial appearance of the latter but at a much lower cost.

Another object of the invention is the provision of means for capping and bracing the ends of double bar bumpers in which the type of bar above referred to is utilized.

A further object is the provision of special supporting means for this type of bar.

Other objects and objects relating to details of construction and economies of manufacture will appear as I proceed with the description of that embodiment of the invention which for the purposes of the present application I have illustrated in the accompanying drawing, in which:

Fig. 1 is a plan view of a bumper embodying the invention;

Fig. 2 is a front elevation of the same;

Fig. 3 is a vertical section taken substantially on line 3—3 of Fig. 2 and showing the parts on a larger scale;

Fig. 4 is a fragmentary view in elevation of one end of the bumper, looking in the direction of arrow 4 of Fig. 1, also on a larger scale; and Fig. 5 is a section taken on the line 5—5 of Fig. 4.

In the drawings, I have illustrated a double bar bumper, which, however, is not essential to the invention in its broader aspects. The two bars referred to are indicated at 10 and 11, being identical in form and arranged one above the other throughout their length. Each of these bars is a sector of a cylinder, but, for the sake of brevity, will be referred to hereinafter as being of arc-shaped cross-section. The convex side of the bar is exposed to the impact in the use of the bumper. The shape is conveniently and economically imparted to the bar in the course of its manufacture by rolling. On account of its shape, the bar is able to withstand a very heavy impact and, therefore, affords a large measure of protection for the automobile upon which it is mounted.

The adjacent ends of the bars 10 and 11 are held together and braced and are also covered, for the sake of appearance, by means of a cap 12 which may be a casting. This cap has a pair of cavities, one for the reception of each of the bars 10 and 11, these cavities being open at the rear of the cap and also along the side through which the bars enter the cavities. Flanges 13, 14, 15 and 16 serve to enclose the edges of the bars. In front the cap member conforms to the shape of the bars and is perforated to receive short bolts 17, the rounded heads 18 of which are exposed, as indicated in Figs. 4 and 5. These bolts also extend through holes in the bars 10 and 11, each one being provided with washers 19 and 20 and a nut 21, these washers and nuts being protected from the elements and practically concealed because of their position within the cavities of the cap, but at the same time being readily accessible should the removal or replacement of the caps be necessary.

It will be obvious that in assembly the caps 12 are slid onto the bars 10 and 11 endwise of the latter, and when in position the bolts 17 are inserted, after which the washers 19 and 20 are applied and the nuts 21 threaded down tightly.

For the support of the bumper, I illustrate a supporting bar 22 adapted to be attached to the supporting brackets on the automobile. Near its ends the bar 22 is bent along corresponding curves of substantial radius and the extremities 23 extend toward each other in a line parallel to the main portion of the bar, as illustrated in Fig. 1. The extremities 23 are preferably flared somewhat to provide inclined flanges 24, Fig. 3, that overlap the proximate edges of the bars 10 and 11.

Each of the extremities 23 of the supporting bar 22 is perforated to receive a bolt 25 which extends through a spacing washer 26 and a hole 27 in a clamp 28, the latter extending transversely across both of the bars 10 and 11, preferably conforming to the curvature thereof and provided with hook-shaped ends 29 which extend around the remote edges of the two bars. A nut 30 is adapted to be threaded onto the bolt 25 and when tightened draws the clamp 28 and the extremity 23 of bar 22 toward each other, whereby pressure is exerted upon the inner or proximate edges of the bars 10 and 11, thus forcing them away from each other and causing their remote edges to be crowded tightly into the hooks 29. The bars are, therefore, held tightly in the clamp 28 and supported upon the extremity 23 of the bar 22 by means of a single bolt.

Since the bars 10 and 11 are quite rigid, it is desirable to provide a resilient mounting so as to absorb more or less of the shock of heavy impacts. In the present instance, I have provided for such resiliency in the curved ends of the bar 22 which is preferably formed of flat spring steel.

Having thus described my invention, I claim:

1. In a bumper for automotive vehicles, an impact receiving bar of arc-shaped cross-section with its convex side presented toward the impact, means for supporting said bar comprising an element extending transversely of the bar and having a hook on one end for engaging one edge of the bar, and means for applying pressure to the opposite edge of the bar causing it to engage firmly in said hook.

2. In a bumper for automotive vehicles, a pair of impact bars spaced one above the other, said bars being of arc-shaped cross-section with their convex sides presented toward the impact, a supporting bar located vertically half way between said impact bars, a clamp extending transversely across both of said impact bars and hooked at its ends to engage the remote edges of the bars, and means for drawing together said clamp and supporting bar whereby pressure is exerted upon the inner edges of the impact bars to spread them and crowd their remote edges into the hooks of the clamp.

3. In a bumper for automotive vehicles, a pair of impact bars spaced one above the other, said bars being of arc-shaped cross-section with their convex sides presented toward the impact, a supporting bar located vertically half way between said impact bars and overlapping the proximate edges of the latter, a clamp extending transversely across both of said impact bars on their convex sides, said clamp having hooked ends to engage the remote edges of the bars, and means for drawing together said clamp and supporting bar whereby pressure is exerted upon the proximate edges of the impact bars to spread the latter and crowd their remote edges into the hooked ends of the clamp.

4. In a bumper for automotive vehicles, a pair of impact bars spaced one above the other, said bars being of arc shaped cross-section with their convex sides presented toward the impact, and a cap joining said bars at their ends and secured thereto by bolts extending through aligned openings in the cap and bars, the cap being open on its rear side to permit access to the bolts, the rear ends of the latter being concealed by the concavity of the bars and cap.

5. In a bumper for automotive vehicles, a pair of impact bars spaced one above the other, said bars being of arc-shaped cross-section with their convex sides presented toward the impact, a supporting bar located vertically half way between said impact bars and overlapping the proximate edges of the latter, a clamp extending transversely across both of said impact bars on their convex sides, said clamp having hooked ends to engage the remote edges of the bars, said supporting bar having inclined flanges opposite said clamp extending around the proximate edges of the impact bars, and means for drawing together said clamp and supporting bar whereby pressure is exerted upon the proximate edges of the impact bars to spread the latter and crowd their remote edges into the hooked ends of the clamp.

6. In a bumper for autimotive vehicles, a pair of impact bars spaced one above the other a distance less than the width of one of the bars, each of said bars being arc-shaped in cross section with its convex side presented towards the impact, and means for supporting said bars comprising elements extending transversely of the bars, each of said elements having a hook for engaging one edge of a bar, and means for applying pressure to the opposite edge of the bar, causing it to engage firmly in said hook.

7. In a bumper for automotive vehicles, a pair of impact bars spaced one above the other a distance less than the width of one of the bars, each of said bars being of a cross section conforming to an arc of a circle with the convex sides presented towards the impact, said circles being non-intersecting, a supporting member located on one side of said impact bars, a clamp extending transversely across the other side of said impact bars, said clamp being hooked at its ends to engage the remote edges of the bars, and means for drawing together said clamp and supporting bar, whereby pressure is exerted upon the inner edges of the impact bars to spread them and press their remote edges into the hooks of the clamp.

In testimony whereof, I hereunto affix my signature.

GEORGE W. VEALE.